(12) United States Patent
Gauthier-Manuel

(10) Patent No.: US 8,802,307 B2
(45) Date of Patent: Aug. 12, 2014

(54) METHOD FOR PRODUCING DIHYDROGEN FROM HYDROGENATED SILICON

(75) Inventor: Bernard Gauthier-Manuel, Besancon (FR)

(73) Assignees: Centre National de la Recherche Scientifique (C.N.R.S.), Paris (FR); Universite de Franche-Comte, Besancon (FR)

( * ) Notice: Subject to any disclaimer, the term of this patent is extended or adjusted under 35 U.S.C. 154(b) by 311 days.

(21) Appl. No.: 12/598,745

(22) PCT Filed: May 2, 2008

(86) PCT No.: PCT/FR2008/050784
§ 371 (c)(1),
(2), (4) Date: Jan. 19, 2010

(87) PCT Pub. No.: WO2008/148988
PCT Pub. Date: Dec. 11, 2008

(65) Prior Publication Data
US 2010/0119896 A1    May 13, 2010

(30) Foreign Application Priority Data
May 4, 2007  (FR) ...................................... 07 54866

(51) Int. Cl.
*H01M 8/06*  (2006.01)
(52) U.S. Cl.
CPC ..................................... *H01M 8/065* (2013.01)
USPC ............ 429/422; 429/416; 429/408; 429/400

(58) Field of Classification Search
CPC ... H01M 8/065; H01M 8/04208; C01B 3/065
USPC .............................................................. 429/19
See application file for complete search history.

(56) References Cited

U.S. PATENT DOCUMENTS

| 4,470,888 | A | * | 9/1984 | Wheaton ....................... 205/503 |
| 5,997,588 | A | * | 12/1999 | Goodwin et al. ............ 29/25.01 |
| 6,399,177 | B1 | * | 6/2002 | Fonash et al. ................. 428/119 |
| 2007/0059859 | A1 | * | 3/2007 | Lysenko et al. ................ 438/99 |

FOREIGN PATENT DOCUMENTS

| DE | 19954513 |   | 5/2000 |   |
| FR | 2858313  |   | 2/2005 |   |
| JP | 59045901 |   | 3/1984 |   |
| JP | 59045901 | A * | 3/1984 | ............... C01B 3/06 |
| JP | 2003308871 |   | 10/2003 |   |
| WO | 2004052774 |   | 6/2004 |   |
| WO | 2007019172 |   | 2/2007 |   |

OTHER PUBLICATIONS

MacDonald et al. Encyclopedia of Electrochemistry, vol. 5, Chapter 11, pp. 760-767, Electrochemical Engineering 2007, ISBN 978-2-527-30397-7.*
International Search Report dated Jan. 15, 2009, in PCT application.

* cited by examiner

*Primary Examiner* — Gary Harris
(74) *Attorney, Agent, or Firm* — Young & Thompson

(57) ABSTRACT

A process for the production of dihydrogen from hydrogenated silicon by bringing the hydrogenated silicon into contact with an alkaline solution. Devices of the fuel cell type using this hydrogen production method are also described.

12 Claims, 1 Drawing Sheet

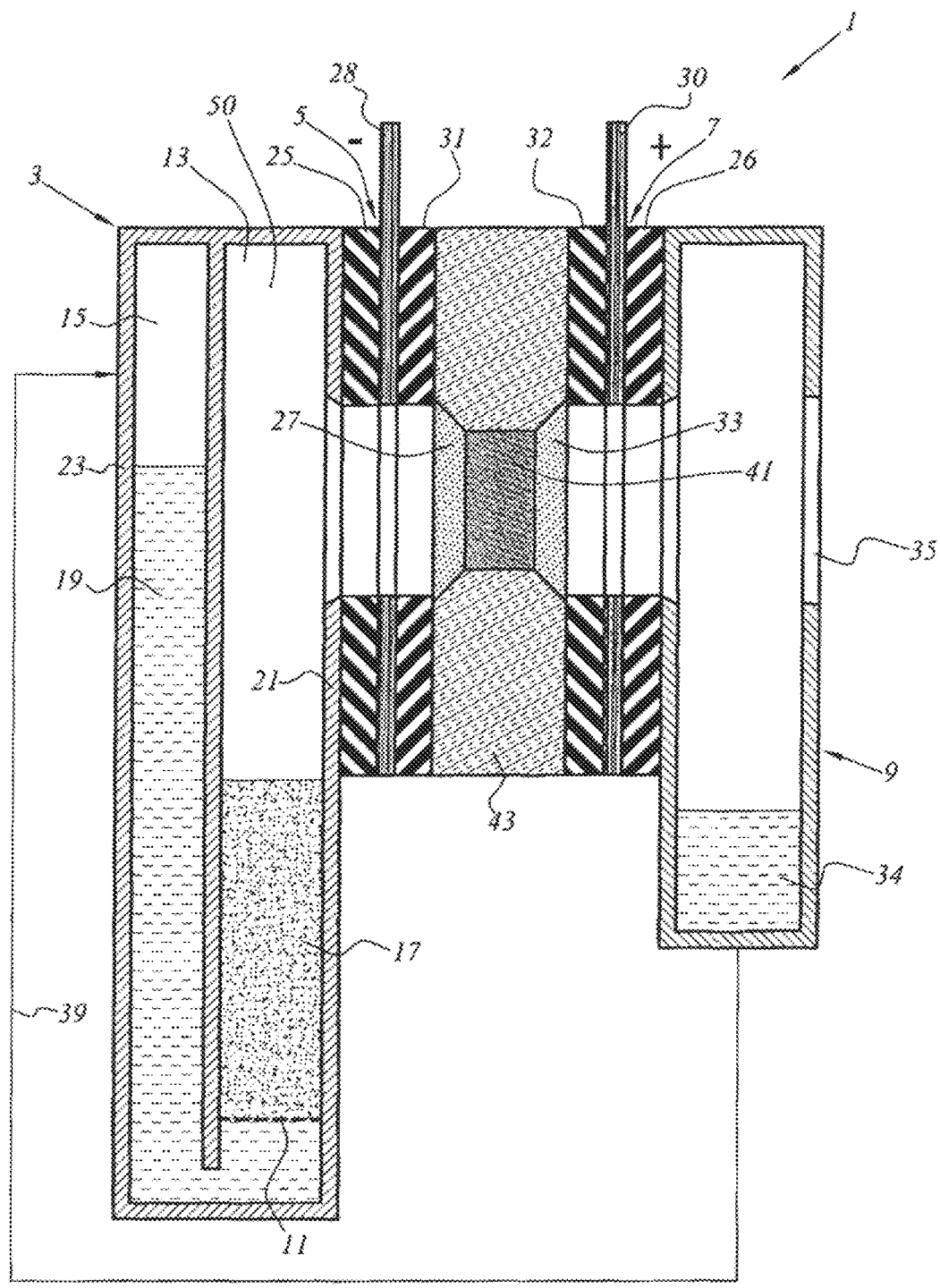

METHOD FOR PRODUCING DIHYDROGEN FROM HYDROGENATED SILICON

The invention relates to a method for producing dihydrogen, for use especially in fuel cells that operate by means of dihydrogen.

At present, the production of dihydrogen involves a prior storage step. However, the storage of dihydrogen as an energy carrier is one of the limitations to the development or miniaturization of fuel cells.

Accordingly, it is known to store the dihydrogen directly in cryogenic tanks or under pressure. Such a storage system presupposes the use of storage equipment which cannot be transposed to fields in which the use of portable devices is necessary, such as mobile telephony. Moreover, cryogenic tanks have the disadvantage that the yield of the dihydrogen liquefaction process is poor. Pressurized tanks in turn present a safety problem.

Other alternatives propose storing the dihydrogen in a different form and then restoring it. The first alternative consists in using intermediate fuels, such as methanol, to produce dihydrogen. However, although such cells are relatively easy to use, they exhibit a poor yield and a certain toxicity due to the release of carbon dioxide. The second alternative consists in storing the dihydrogen at atmospheric pressure using solid metal hydrides or carbon nanotubes, but their poor dihydrogen production capacity and the necessity of supplying energy in order to desorb the dihydrogen render them uninteresting.

It is also known to generate dihydrogen chemically from the decomposition of sodium borohydride in an alkaline medium. The disadvantage of that method is that it is necessary to use a catalyst in order to operate at ambient temperature.

In addition, FR 2 858 313 mentions the possibility of producing dihydrogen using porous silicon anodized by hydrofluoric acid under atmospheric pressure. The dihydrogen is then released by the supply of energy, including chemical energy, by contact with ethanol. A disadvantage of that variant is that the system must be recharged with hydrofluoric acid in order to regenerate the porous silicon.

An object of the present invention is to provide a method which allows dihydrogen to be produced effectively as required, without having to employ storage or restoration steps of the above-mentioned type.

To that end, according to a first aspect, the present invention relates to a method for producing dihydrogen, comprising a step in which a hydrogenated silicon is brought into contact with an alkaline solution (whereby dihydrogen is generated) and a step in which the dihydrogen so formed is recovered and/or utilized. The hydrogenated silicon used is obtained by electrochemical treatment of a silicon substrate with an acid. More generally, the present invention relates to the use of a hydrogenated silicon to produce dihydrogen which is to be recovered and/or utilized, wherein the hydrogenated silicon is brought into contact with an alkaline solution.

According to the invention, a reaction of an alkaline solution with a hydrogenated silicon is carried out.

The alkaline solution reacts with the silicon-hydrogen layer, thus releasing dihydrogen while forming a new layer of silicon-hydrogen on the surface of the silicon substrate, especially of the porous silicon substrate.

The production of dihydrogen according to the invention can be summarized schematically by the following reaction (I):

$$\text{—Si—Si—H} + 4H_2O \rightarrow \text{—Si—H} + Si(OH)_4 + 2H_2 \quad (I)$$

An advantage of the use of the above-mentioned reaction is that it allows the dihydrogen to be produced in a single step.

Moreover, as illustrated above, reaction (I) at the same time induces reactivation of the silicon by re-forming surface silicon-hydrogen bonds. On that basis, dihydrogen can be produced again on demand by carrying out reaction (I) again.

Furthermore, by virtue of the use of the reaction according to the invention, dihydrogen is produced without having to employ a storage step prior to restoration.

"Hydrogenated silicon" is understood as being a hydrogenated silicon substrate, the hydrogenation being obtained by electrochemical treatment of the silicon substrate with an acid. The silicon substrate is generally a silicon plate. The substrate preferably contains not more than $10^{19}$ atoms cm$^{-3}$ of impurities such as boron or phosphorus, for example.

The hydrogenated silicon used according to the invention is preferably in the form of a solid material typically having at least one dimension greater than at least 0.5 mm, especially greater than 1 mm, preferably greater than 1 cm. The notion of "solid material" within the context of the present description refers to a macroscopic solid material of the manipulable type, such as a plate (advantageously having a thickness of at least 0.5 mm, especially of at least 1 mm, and lengths and widths of the order of at least one centimetre) or a cylinder (advantageously having a length of at least 5 mm and a diameter of at least 0.5 mm, especially 1 mm). Accordingly, in a solid material within the context of the present description, the silicon is generally hydrogenated only on its surface, the core of the material in most cases being composed substantially of silicon. The definition of a solid material within the context of the present description excludes supported hydrogenated silicon materials in the form of a layer having a thickness less than 1 mm, especially less than 0.5 mm, and hydrogenated silicon particles having a size less than 1 mm, especially less than 0.5 mm, in dispersed form.

The hydrogenated silicon used within the scope of the invention is preferably porous. According to a preferred embodiment, the hydrogenated porous silicon used is constituted by mesoporous silicon, that is to say silicon having pores of a size of from 2 to 50 nm (mesopores), and/or microporous silicon, that is to say silicon having pores of a size less than 2 nm (micropores).

The presence of pores (mesopores and/or micropores especially) allows, inter alia, the specific surface area of the silicon substrate to be increased, yielding, for a given volume, a larger quantity of dihydrogens present at the surface of the hydrogenated porous silicon. The porosity of the hydrogenated silicon is from approximately 10% to approximately 70% by volume. The above-mentioned porosity by volume corresponds to the ratio between the volume of the pores present in the sample and the volume of the sample. That porosity is determined, for example, by calculating the refractive index of the porous silicon from an optical reflectometry measurement, or by weighing by comparing the masses of the sample before and after anodization.

The specific surface area of the hydrogenated silicon is from approximately 200 m$^2$·cm$^{-3}$ to approximately 900 m$^2$·cm$^{-3}$. The specific surface area can be determined, for example, by the BET method when the hydrogenated silicon is in a sufficient amount. The above-mentioned BET method is the BRUNAUER-TELLER method described especially in The Journal of the American Chemical Society, Volume 60, page 309, February 1938 and corresponding to international standard ISO 5794/1. The specific surface area of a hydrogenated silicon can be determined, more generally, by quantification of the mass of a silane monolayer autoassembled on the surface of the porous silicon to be characterized.

In the method of the invention, the amount of dihydrogen available per unit time is dependent on the specific surface area and also on the amount of silicon present. Typically, the production of hydrogen is of the order of 0.16 liter per gram of Si and per minute.

The hydrogenated silicon employed according to the invention is obtained by electrochemical treatment of a silicon substrate with an acid, the acid advantageously being hydrofluoric acid.

The silicon substrate used in the present invention is, for example, a standard microelectronic substrate, such as a phosphorus-doped silicon having a resistivity typically of the order of 0.016 $\Omega \cdot cm$, or a boron-doped silicon having a resistivity of, for example, of the order of 0.005 $\Omega \cdot cm$. The silicon substrate used has an atomic concentration of impurities of not more than approximately $10^{19}$ $cm^{-3}$. Such treatment allows the silicon substrate to be porosified and, at the same time, permits the creation of a first layer of Si—H$_x$, wherein x=1, 2 or 3, on the surface of the porosified silicon substrate.

In one embodiment, the electrochemical treatment is an electrochemical anodization, which is preferably carried out on a monocrystalline, polycrystalline or amorphous silicon substrate. After the electrochemical treatment, the silicon substrate has become both mesoporous and/or microporous and hydrogenated.

The hydrogenated silicon generally comprises silicon nanocrystallites and/or nanoparticles of various geometric forms, which may or may not be mutually interconnected, of which at least one dimension is less than or equal to approximately 100 nm and in which the sum of the surface areas of each crystallite and/or nanoparticle is greater than the planar surface area occupied by the hydrogenated silicon.

According to a variant, the hydrogenated silicon is ground and optionally compacted, thus enabling it to be used easily in a device that employs dihydrogen, such as a fuel cell.

After the electrochemical treatment, all or part of the surface of the silicon substrate, especially of the porous silicon substrate, comprises silicon groups bonded to hydrogens, surface —Si—H, capable of carrying out the above-mentioned reaction (I).

In the method of the invention, the reaction temperature of the alkaline solution with the hydrogenated silicon is generally from approximately 10° C. to approximately 40° C., preferably that temperature is conducted at ambient temperature. The reaction is preferably carried out at atmospheric pressure or at slightly elevated pressures, generally less than or equal to approximately 2 bar, approximately from 1 bar to 1.5 bar.

The alkaline solution used in the method of the invention is preferably an aqueous alkaline solution. The pH of the alkaline solution is especially from approximately 9 to approximately 14, preferably approximately from 9 to 13, for example of the order of 10. The base can be selected especially from NaOH, KOH and NH$_4$OH. Preferably, the aqueous alkaline solution is an aqueous NaOH and/or KOH solution.

One advantage of the method of the invention is that the totality of the silicon substrate is available to react with the alkaline solution and thus generate dihydrogen, unlike the alternative proposed in application FR 2 858 313, where only the surface of the material is used to store the dihydrogen. The dihydrogen production capacity is therefore found to be greater in the method according to the invention. In particular, the method according to the invention permits the formation of two moles of dihydrogen per mole of hydrogenated silicon, that is to say approximately 1.6 liters of dihydrogen per gram of hydrogenated silicon at atmospheric pressure and ambient temperature.

Another advantage of the method of the invention is that it comprises only a single step for producing the dihydrogen, thus creating a lower production cost than that of devices requiring two steps or more, which generally use intermediate compounds which are often expensive.

Preferably, the method according to the invention further comprises a step in which the dihydrogen is recovered and utilized, for example the dihydrogen is used as a fuel.

According to a second aspect, the invention relates to a fuel cell comprising an anode that operates by means of dihydrogen and is associated with a device for producing dihydrogen from hydrogenated silicon, the device comprising hydrogenated silicon which is brought into contact with an alkaline solution to generate dihydrogen from hydrogenated silicon by carrying out the method of the invention.

As illustrated in equation (I), the hydrogenated silicon brought into contact with the alkaline solution permits the production of two equivalents of dihydrogen by regenerating a silicon-hydrogen bond at the surface of the silicon substrate.

One advantage of the method according to the invention is that the hydrogenated silicon is regenerated in situ, during operation of the cell. Accordingly, with an identical amount of silicon, the amount of dihydrogen available is greater than that of a device that comprises only dihydrogen chemisorbed at the surface of the silicon substrate, especially of the porous silicon substrate. The operating time of the cell therefore depends on the amount of silicon substrate introduced initially.

Preferably, as the device for producing hydrogen to supply the anode, the cell comprises a reservoir comprising:

a first compartment which is partly or completely filled with hydrogenated silicon, the first compartment generally being separated into two zones, namely a first zone comprising the hydrogenated silicon and a second zone which is in contact with the anode and is to receive the dihydrogen that is formed, and a second compartment which is completely or partly filled with an alkaline solution, the first and second compartments communicating in such a manner that the alkaline solution is able to come into contact with the hydrogenated silicon. According to a preferred form, the reservoir is of the interchangeable type and therefore acts both as the hydrogenated silicon supply system and as the alkaline solution supply system.

According to one embodiment, the dihydrogen-producing device of the fuel cell comprises a hydrogenated silicon supply system. That system permits the initial introduction of hydrogenated silicon. Moreover, additional hydrogenated silicon can be introduced into the hydrogen-producing device of the cell via that supply system when the silicon substrate initially present has been consumed completely or when it has been consumed beyond a certain threshold, for example beyond 75% or even 85%, still better 95%, of the hydrogenated porous silicon substrate initially present. The hydrogenated silicon supply system can be an external supply system or a system permitting the exchange of a cartridge containing the hydrogenated silicon.

According to an embodiment generally associated with the preceding embodiment, the fuel cell further comprises an alkaline solution supply system in the region of the dihydrogen-producing system. That supply system allows the alkaline solution to be introduced initially and to be regenerated during the lifetime of the cell, especially in order to supply further basic component. The alkaline solution supply system permitting operation of the cell can especially be an external system.

The porous silicon and the alkaline solution, in an amount sufficient to hydrolyze the porous silicon, are typically contained in a removable container, for example a cartridge which can be snap-fitted onto the fuel cell in a sealed manner.

According to another embodiment, the alkaline solution is contained in a removable container which is separate from the hydrogenated silicon supply system, and its replacement allows the cell to continue to operate.

According to yet another embodiment, the removable container, for example the cartridge, comprises a first compartment comprising the hydrogenated silicon and a second compartment containing the alkaline solution. The two compartments are generally separated by a separation system which prevents the hydrogenated silicon from passing from the first compartment to the second compartment but nevertheless allows at least some of the alkaline solution to flow from the second compartment to the first in order to come into contact with all or some of the hydrogenated silicon. The separation system is typically a grid.

In most cases, the cathode of the cell operates by means of dioxygen. According to this embodiment, the anode and the cathode preferably comprise a medium which diffuses dihydrogen and dioxygen, as well as a catalyst and a proton conductor.

The diffusing medium is also an electron conductor and is composed, for example, of woven carbon fibres in which there are included porous graphite particles. The gas molecules in this case pass through the mesh of woven fibres and the electrons are carried by the carbon fibres. According to another embodiment, it is also composed of a gas-permeable crosslinked polymer such as PDMS (polydimethylsiloxane) which is loaded with porous graphite particles.

The catalyst is composed of finely divided platinum incorporated into the porous graphite particles.

According to one embodiment, the catalyst is composed of platinum nanoparticles (typically having dimensions of from 2 to 50 nm) which are coated with proton-conducting molecules by chemical grafting and are dispersed in a matrix, such as PDMS, which is permeable to water and to gases at a concentration greater than the percolation threshold in order to permit electron and proton conductivity.

The proton conductor is, for example, an ionomer such as Nafion® or is composed of molecules which carry groups identical with those used to produce the membrane and grafted to the surface of the grains of the catalyst. The proton conductor is here a molecule or macromolecule comprising at least one group capable of capturing and then releasing a proton in order that the latter circulates in the generator. The group capable of capturing and then releasing a proton is selected from the sulfonate ($-SO_3^-$) or carboxylate ($-COO^-$) groups. In particular, it is advantageous to use a molecule or macromolecule comprising a fluorinated skeleton, which especially allows the mobility of the protons to be increased.

The dioxygen comes, for example, from a supply composed of air, preferably enriched air, from a supply comprising pure dioxygen or ambient air. The dioxygen is transported, for example, by means of a pipe or the like from the supply to the cathode. To that end, the cathode is equipped with an orifice by which the pipe or the like is connected.

The overall operation of the cell is summarized by the following reaction:

$$2H_2 + O_2 \rightarrow 2H_2O \qquad (II)$$

In so far as the dihydrogen-producing reaction (I) consumes four equivalents of water molecules and the cell-operating reaction (II) produces two, all or some of the water that is produced can be recycled during operation of the cell. Preferably, the water is reused to react with the silicon-hydrogen layer, thus solving the problem associated with the production of water. According to a preferred embodiment, the other two equivalents of water molecules that are missing are supplied by the water present in the aqueous alkaline solution. To that end, the cell typically comprises means for bringing water produced by the reaction (II) in the region of the aqueous alkaline solution, typically a pipe. An external system for supplying alkaline compound contained in the aqueous alkaline solution then allows the cell to have a constant concentration of alkaline compound and therefore enables the pH to be kept constant despite the supply of recycled water.

The cell accordingly has the advantage of being self-regulating. The local dihydrogen pressure at the alkaline solution/hydrogenated silicon interface is in fact dependent on the amount of dihydrogen present in the anode compartment of the cell. When the electric current is interrupted, the consumption of dihydrogen ceases, which increases the pressure. The resulting increase in pressure then pushes the level of the alkaline solution below the level at which the silicon substrate, especially the porous silicon substrate, is located. The dihydrogen production reaction is thus stopped. Likewise, in the presence of an electric current, the pressure in the anode compartment decreases, drawing the alkaline solution into contact with the silicon substrate, especially the porous silicon substrate. The production of dihydrogen is accordingly reactivated.

The maximum dihydrogen storage pressure is from approximately 0.1 to approximately 1 bar or even from approximately 0.5 bar to approximately 0.9 bar. According to one embodiment, the pressure is approximately 800 mbar.

The cell additionally comprises a diffusing medium allowing the dioxygen and the dihydrogen to diffuse, the electronic energy to be recovered and the water to be recycled. According to one embodiment, the diffusing medium is composed of graphite fabric, for example that marketed by E-tek.

The cell can comprise a membrane, for example a porous silicon membrane whose inside surface is grafted chemically to proton conductors, especially molecules carrying at least one sulfonate ($-SO_3^-$) or carboxylate ($-COO^-$) group.

According to another embodiment, the membrane is composed of porous silicon whose pores are filled with an ionomer such as Nafion®. The membrane allows the protons resulting from the operation of the cell to pass, but is impermeable to gaseous dihydrogen and dioxygen.

The invention will be illustrated further upon reading the non-limiting example given below with reference to the accompanying single FIGURE.

The FIGURE shows an embodiment of a dihydrogen generator according to the invention.

The FIGURE describes a cell 1 comprising a dihydrogen-producing device which is an interchangeable reservoir 3 adjacent to an anode part 5. The cell 1 further comprises a cathode part 7 adjacent to a water recovery container 9.

The interchangeable reservoir 3 is a removable container having a U-shaped cross-section or the like, for example a cartridge. The interchangeable reservoir 3 comprises a first compartment 13 (diagrammatically in a first branch of the U-shaped cross-section) and a second compartment 15 (diagrammatically in the other branch of the U-shaped cross-section) which are separated by a grid 11. The first compartment 13 of the interchangeable reservoir 3 is filled with hydrogenated porous silicon 17 resting on the grid 11. The hydrogenated porous silicon 17 is typically obtained by anodization of a boron-doped silicon plate having a resistivity of approximately 0.0012 Ω·cm and a thickness of approximately 500 μm in a bath composed of a 1:1 mixture of approximately 48% hydrofluoric acid and pure ethanol. Anodization carried out with a current density of approximately 100 mA·cm$^{-2}$ produces pores having a diameter of approximately 20 nm at a rate of approximately 200 nm·s$^{-1}$. The totality of the silicon is anodized in approximately 2500 s.

The second compartment 15 of the interchangeable container 3 is filled partly or, in some cases, completely with a 0.0001 mol·l$^{-1}$ NaOH solution 19.

The wall 21 of the first compartment 13 containing the hydrogenated porous silicon 17 is in fluid connection with the anode part 5, a seal 25 ensuring tightness with respect to the outside medium.

The wall 23 of the second compartment 15 comprises a valve (not shown) which allows the second compartment 15 to be brought to atmospheric pressure.

The anode part 5 comprises a negative terminal 28. The positive terminal 28 is surrounded by the seal 25 and by a conductive seal 31 which conducts the electrons. The anode part 5 also comprises an anode 27 which is attached to the electricity-conducting seal 31 and is composed, for example, of a carbon fabric coated on its inside face with graphite powder containing the platinum catalyst.

The reaction that occurs at the anode 27 is reaction (II):

$$H_2 \rightarrow 2H^+ + 2e^-$$ (II)

The cathode part 7 comprises a positive terminal 30. The positive terminal 30 is surrounded by a seal 26 and a second electricity-conducting seal 32 which conducts the electrons. The cathode part 7 also comprises a cathode 33 which is attached to the second electricity-conducting seal 32 and is composed, for example, of a carbon fabric coated on its inside face with graphite powder containing the platinum catalyst.

The chemical reaction that occurs at the cathode 33 is the conventional reaction (III):

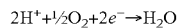

$$2H^+ + \tfrac{1}{2}O_2 + 2e^- \rightarrow H_2O$$ (III)

The cathode part 7 is further connected, by way of the seal 26, to the water recovery container 9, allowing the water 34 produced during operation of the cell to be recovered.

The negative and positive terminals 28 and 30 allow the current to be delivered and, in association, constitute a power outlet.

The recovery container 9 also comprises a polymer window 35 made of Teflon® which is permeable to dioxygen. The polymer window 35 can be PDMS in a variant.

A recycling circuit 39 located at the outlet from the recovery container 9 for connecting the second compartment 15 of the interchangeable reservoir 3 allows the water 34 to be used to supply the NaOH solution 19 for generating dihydrogen in the interchangeable reservoir 3.

The cell 1 is of the PEM (proton exchange membrane) type and therefore comprises a membrane 41, which can be composed of porous silicon. In that case, it is generally a porous silicon which has been rendered proton-conductive either by impregnation with a solution of ionomer (Nafion®) or by the grafting of molecules. It is to be noted that the porous silicon of the membrane 41 is not used to produce dihydrogen. In fact, it is not hydrogenated silicon.

The membrane 41 permits separation of the anode 27 and the cathode 33, which are adhesively bonded by a Nafion® solution to an electrically insulating membrane 43. In addition, an insulating frame (not shown) of oxidized silicon surrounds the membrane 43, the anode 27 and the cathode 33 in order not to lose current.

During operation, the NaOH solution 19 contained in the second compartment 15 comes into contact with the hydrogenated porous silicon 17 contained in the first compartment 13 through the grid 11. Dihydrogen is thus produced according to reaction (I):

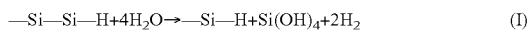

$$—Si—Si—H + 4H_2O \rightarrow —Si—H + Si(OH)_4 + 2H_2$$ (I)

Once formed, the dihydrogen fills the zone 50 located above the hydrogenated porous silicon 17 present in the first compartment 13. The dihydrogen is then used by the anode 27, which produces electrons by the conventional reaction (II).

In parallel, the oxygen penetrates the cathode part 7 and reacts with the protons and electrons from the reaction (II) to produce water, as is shown schematically by reaction (III).

Accordingly, as the cell 1 operates, the NaOH solution 19 consumes the hydrogenated porous silicon 17 in order to produce dihydrogen.

When the cell 1 stops operating by some means, the dihydrogen accumulates in the zone 50 and pushes the NaOH solution 19 beneath the grid 11. The NaOH solution 19 is accordingly no longer in contact with the hydrogenated porous silicon 17 and the production of dihydrogen stops.

The invention claimed is:

1. A method for producing dihydrogen, comprising the steps of:
   treating electrochemically by electrochemical anodization a silicon substrate with hydrofluoric acid, whereby a hydrogenated silicon comprising —Si—H surface bonds is obtained;
   bringing the obtained hydrogenated silicon into contact with an alkaline solution selected from the group consisting of NaOH, KOH and NH$_4$OH and having a pH from 9 to 13, whereby (i) dihydrogen is generated and (ii) —Si—H surface bonds are reformed on the surface of the hydrogenated silicon; and
   recovering and/or utilizing the generated dihydrogen.

2. The method according to claim 1, wherein the hydrogenated silicon is porous.

3. The method according to claim 2, wherein the porous hydrogenated silicon is composed of mesoporous and/or microporous silicon.

4. The method according to claim 2, wherein the porosity of the hydrogenated silicon is from 10% to 70% by volume.

5. The method according to claim 2, wherein the specific surface area of the hydrogenated silicon is from 200 m$^2$·cm$^{-3}$ to 900 m$^2$·cm$^{-3}$.

6. The method according to claim 1, wherein the aqueous alkaline solution is an aqueous NaOH and/or KOH solution.

7. Fuel cell (1) comprising an anode (27) that operates by means of dihydrogen in association with a dihydrogen-producing device, comprising hydrogenated silicon (17) which is brought into contact with an alkaline solution (19) to generate dihydrogen from hydrogenated silicon (17) by carrying out the method according to claim 1.

8. Fuel cell (1) according to claim 7, wherein the dihydrogen-producing device comprises a reservoir (3) for supplying the anode (27), comprising:
   a first compartment (13) which is partly or completely filled with hydrogenated silicon (17);
   a second compartment (15) which is completely or partly filled with the alkaline solution (19), the first and second compartments (13, 15) communicating in such a manner that the alkaline solution (19) is able to come into contact with the hydrogenated silicon (17).

9. Fuel cell (1) according to claim 7, wherein the dihydrogen-producing device comprises a hydrogenated silicon supply system associated with an alkaline solution supply system.

10. Fuel cell (1) according to claim 8, wherein the dihydrogen-producing device comprises a hydrogenated silicon supply system associated with an alkaline solution supply system, the hydrogenated silicon supply system and the associated alkaline solution supply system being in the form of the reservoir (3).

11. Fuel cell (1) according to claim 10, wherein the hydrogenated silicon supply system and the associated alkaline solution supply system are in the form of an interchangeable reservoir.

12. The method according to claim 1, wherein the hydrogenated silicon is a solid material having at least one dimension greater than 0.5 mm.

* * * * *